(12) United States Patent
Harp (10) Patent No.: US 11,576,368 B2
(45) Date of Patent: Feb. 14, 2023

(54) DEER RUB OR LURE

(71) Applicant: Steve Harp, LaGrange, KY (US)

(72) Inventor: Steve Harp, LaGrange, KY (US)

( * ) Notice: Subject to any disclaimer, the term of this patent is extended or adjusted under 35 U.S.C. 154(b) by 0 days.

(21) Appl. No.: 17/191,824

(22) Filed: Mar. 4, 2021

(65) Prior Publication Data

US 2022/0279775 A1 Sep. 8, 2022

(51) Int. Cl.
*A01M 31/00* (2006.01)
*A01K 13/00* (2006.01)
*E04H 12/22* (2006.01)

(52) U.S. Cl.
CPC ......... *A01M 31/008* (2013.01); *A01K 13/004* (2013.01); *E04H 12/2215* (2013.01)

(58) Field of Classification Search
CPC .... A01M 31/00; A01M 31/008; A01M 31/06; A01M 31/004; E04H 12/2215; G09F 17/00
USPC ................. 248/520, 530, 156, 507, 508, 87; 211/196, 197
See application file for complete search history.

(56) References Cited

U.S. PATENT DOCUMENTS

| | | | | |
|---|---|---|---|---|
| 1,933,495 A * | 10/1933 | Howard | ................. | A47G 33/06 428/20 |
| 4,843,746 A * | 7/1989 | DesNoyers | ............... | G09F 7/18 40/607.04 |
| 6,412,748 B1 * | 7/2002 | Girard | ................. | E04H 12/2215 248/530 |
| 6,626,406 B1 * | 9/2003 | Olson, Jr. | ................ | H02G 7/20 248/219.2 |
| 7,172,163 B1 * | 2/2007 | Johnson | ............. | A47G 29/1216 232/39 |
| 8,938,905 B1 * | 1/2015 | Moore | .................... | A41G 1/007 43/2 |
| 9,192,155 B2 * | 11/2015 | Saringer | ............... | A01M 31/06 |
| 9,262,948 B2 * | 2/2016 | Pounders | ................ | G09F 13/02 |
| 9,542,871 B1 * | 1/2017 | White | ................ | G09F 15/0056 |
| 9,545,097 B2 * | 1/2017 | Moore | .................... | A41G 1/007 |
| 2004/0237373 A1 * | 12/2004 | Coleman | ............... | A01M 31/06 43/3 |
| 2014/0123538 A1 * | 5/2014 | Matheson | .............. | F16M 13/02 43/2 |
| 2017/0027161 A1 * | 2/2017 | Jones | ..................... | A41G 1/007 |
| 2019/0380328 A1 * | 12/2019 | Strussion | ............ | A01M 31/008 |

* cited by examiner

*Primary Examiner* — David J Parsley
*Assistant Examiner* — Shada Mohamed Alghailani
(74) *Attorney, Agent, or Firm* — Witters & Associates; Steve Witters (57) ABSTRACT

Provide herein is a deer rub or lure and a method of luring a deer to a selected area. The deer rub or lure has a trunk or signpost with at least one aperture extending therein. A flexible rod extends into at least one of the apertures. Each of the flexible rods extends from the trunk or signpost at an angle between 90° and 180°. A licking branch is attached to the flexible rod. A flexible support extends from a lower end of the trunk or signpost, and the support is configured to flexibly support the trunk or signpost in a substantially vertical orientation.

15 Claims, 4 Drawing Sheets

DEER RUB OR LURE

FIELD OF THE DISCLOSURE

This disclosure relates generally to buck rubs or lures configured to attract deer.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Deer are one of the most popular game animals for hunting. Various techniques have been used to attract deer, especially bucks, to hunting locations. These techniques often involve the use of food or scents to attract deer. Deer can be very territorial, particularly bucks during the mating season, and will often frequent the same locations. As a result, hunters often look for signs of deer activity, which can include deer beds, trails, scrapes, and rubs.

A rub is often made on trees or brush when a buck rubs his antlers or forehead against it, often wearing off exterior portions of the plant or bark. Buck rubs sometimes appear in early to mid-September, in much of the US. That's typically when bucks lose their antler velvet, a soft, blood-rich tissue that covers growing antlers from early spring through summer, in most of the US. Once antlers are fully developed, their velvet starts drying and shedding. Bucks accelerate its removal by rubbing their antlers on trees or raking them through brush or on trees, sometimes making a rub visible on a tree.

For much of the country, the mating season or rut occurs from late October to early December. Before and during the rut, bucks rub trees to mark their territory, work off aggression, and intimidate other bucks. A series of rubs may be made along a trail or field edge are called rub lines, and provide clues about a deer's travel patterns.

Buck rubs may serve as a signpost or display dominance symbols and communication signposts. They notify other deer of the deer's presence and possibly its breeding intentions. When a buck rubs trees, brush and saplings, it leaves behind scents from its forehead and may rub the bark from a tree or leave other visible signs. For example, a buck may transfer a scent such as wax from its pre-orbital gland, located in its eyes. Other deer may sniff rubs, and sometimes rub the spot themselves before moving on. Bucks rub tree trunks, tree limbs, and brush of a variety of sizes, such as saplings and large trees. While rubbing, bucks may leave a waxy secretion form their pre-orbital gland which may notify other deer of his presence.

It may be desired to have a deer rub or lure that may be placed at a desired location.

SUMMARY

In one aspect of the present disclosure, a deer rub or lure is provided. The deer rub or lure comprises: a trunk or signpost with at least one aperture extending therein; a flexible rod extending into at least one of the apertures; a licking branch attached to, and extending from, the flexible rod; wherein each of the flexible rods extend from the trunk or signpost at an angle between 90° and 180°; a flexible support extending from a lower end of the trunk or signpost, and wherein the flexible support is configured to flexibly support the trunk or signpost in a substantially vertical orientation.

In another aspect of the present disclosure, a method of luring a deer to a selected area is provided. The method comprises the steps of: selecting an area to which to lure the deer; flexibly supporting a trunk or signpost on the ground at the selected area; extending at least flexible rod into an aperture in the trunk or signpost, from the trunk or signpost at an angle between 90° and 180°; and attaching a licking branch to the flexible rod and extended a portion of the licking branch beyond an upwardly extending end of the flexible rod.

BRIEF DESCRIPTIONS OF THE DRAWINGS

The following figures, which are idealized, are not to scale and are intended to be merely illustrative of aspects of the present disclosure and non-limiting. In the drawings, like elements are depicted by like reference numerals. The drawings are briefly described as follows.

DETAILED DESCRIPTION

Aspects of the present disclosure provide a deer rub or lure for luring deer to a desired location or area. The deer rub or lure has a trunk which may have bark on its outer surface. For example, the trunk may be a cut trunk of a tree. A deer may be lured to the trunk for rubbing. Upon rubbing the trunk, the trunk may have some bark removed and may become a signpost. For example, bark rubbed away from the trunk or a scent left on the trunk, upon being rubbed, may provide a cue or signal to other deer. This cue or signal offered by the rubbed off bark or sent, transforms the trunk into a signpost. For example, a signpost may provide an appearance or scent that the deer rub or lure may have been worked previously by a deer. The signpost may lure other deer to the rub or lure, especially during the rut.

The trunk may be a cut portion of a tree, such as a trunk or branch. The trunk may extend between about 3 feet and 5 feet from the ground. For example, the trunk may be a cut section from a deciduous or hardwood tree or from a coniferous evergreen. For example, the trunk or signpost may be locust or cedar. It may be desirous to have the trunk made from a tree that is naturally found in the area where the deer rub or lure is placed.

The trunk or signpost has one or more outwardly extending flexible rods. One or more licking branches may extend from the flexible rod. The licking branches may provide for a licking, rubbing, or chewing by the deer which may further entice or maintain the presence of the deer for a longer period of time. The licking branches extend beyond an end of the flexible rod to which they are held and may extend upwardly at an angle from the trunk to provide a height that may be desirous for a deer. A deer may lick or chew on the licking branches. A buck may taste and rub their pre-orbital gland on licking branch, leaving the wax from the pre-orbital gland as scent for bucks or does, or he may rub his antlers against the licking branches to remove velvet. The licking branches may have angular cut ends which may be desirous for the deer. Additionally, angular cut licking branches may improve the transfer of pre-orbital wax from a buck. The licking branches may extend upwardly at an angle from the trunk to provide a height that may be desirous for a doe, young deer, or buck.

Material, such as grape vine, may extend from the flexible rod or licking branches. This extending material may provide for additional luring or additional material for licking, rubbing, or chewing by the deer. The extending material may have angular cut ends which may be desirous for the deer or for the transfer of scent. An angle licking branch cut or angled vine cut may provide ease for deer to pass scent onto the lure or may provide for scratching of the head or face, which may aid in the deposition of pre-orbital wax from a buck. The licking branches and extending materials may provide for more than a single texture, taste, or scent. For example, grape vine may extend from a hardwood licking branch, which may provide for licking or chewing materials having different scents and tastes.

Another luring material may be attached to the flexible rod. For example, an evergreen wood may be attached to the flexible rod. In at least one embodiment, a piece of evergreen wood, such as a cedar branch, is attached to a lower portion of the flexible rod. The evergreen wood may have needles which may be rubbed off by a buck. The needles may fall to provide a bed of needles. For example, a buck may rub a cedar branch attached to the flexible rod and may transfer pre-orbital gland wax onto the cedar branch and its needles. While rubbing, the needles may fall and provide the bed of needles with the scent of the pre-orbital wax. The ground below, or proximate, the deer rub or lure may scraped by the buck. The scent and scrape may lure other bucks or does.

The deer rub or lure of the present disclosure may provide for the placement at a desired location. For example, the deer rub or lure may portable and may be carried to a desired location and installed by hand. The deer rub or lure may function as a signpost, especially after being rubbed. Preferred locations of placement may include areas that are easily accessible by a hunter such as proximate a trail. It may be advantageous to place the deer rub or lure in an area having few trees, like in a food plot, or an area having signs that deer are present.

The deer rub or lure may be left at a desired location for an extended period of time, such as throughout a hunting season or even a year or longer. Leaving the deer rub or lure set and held at a desired location may lure deer to the location throughout the hunting season.

Natural materials, such as tree branches, may be used for the trunk and the licking branches. Vines, such as grape vines, may be attached to, or hung from the flexible rods or licking branches. For example, locust or other hardwood or other trees may be used licking branches and locust or other hardwood and cedar or other trees may be used for the trunk.

Having the wood making up the trunk different than the wood making up the licking branches may provide a desired variety for the deer. Licking branches of different woods may be used to provide for a further variety for the deer. The licking branches may be desirous for does as well as bucks.

In at least one embodiment, the trunk comprises cedar and the licking branches comprise locust. Such natural materials may be harvested locally and may provide a deer rub or lure that are of a type of wood that the deer is accustomed too.

Other materials may be held with the flexible rod. For example, a piece of coniferous evergreen, such as pine or cedar, may also be attached to the flexible rods. The coniferous wood may have needles, or needle like leaves, that may be rubbed off by a buck. For example, a cedar limb may have pre-orbital gland wax transferred thereto, which may fall from the cedar limb to the ground below.

A hunter may prime the deer rub or lure. For example, dirt may be taken from an existing scrape, where a deer may have urinated, and moved onto, or proximate, the deer rub or lure. Material may be transferred from an existing rub onto the deer rub or lure, which may transfer pre-orbital wax onto the deer rub or lure. A hunter may also move the deer rub or lure to a more desirous location.

Reference will now be made in detail to the present exemplary embodiments and aspects of the present invention, examples of which are illustrated in the accompanying figures. Wherever possible, the same reference numbers will be used throughout the figures to refer to the same or like parts.

Figure 1:
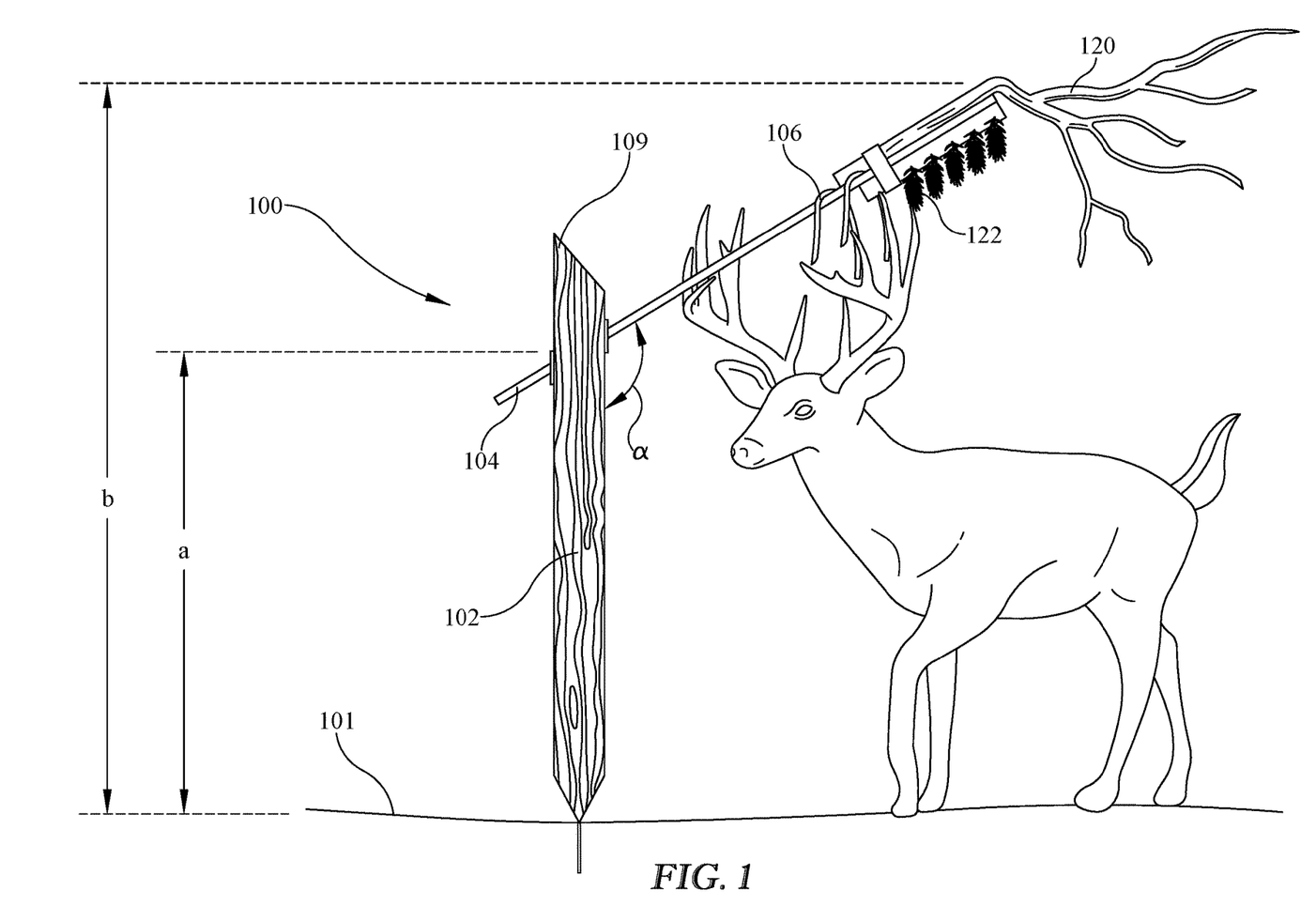
FIG. 1 is an illustrative view of the deer rub or lure of the present disclosure showing the disposition of features thereof.

FIG. 1 shows an illustrative view of the presently disclosed deer rub or lure 100. Deer rub or lure 100 has a trunk or signpost 102 with at least one aperture, 103a, 103b, and/or 103c, shown in FIG. 2a, extending therein. A flexible rod 104 extends into at least one of the apertures A licking branch 120 is attached to flexible rod 104 and has a portion extending outwardly beyond an end of flexible rod 104. Each flexible rod 104 extends from the trunk or signpost 102 at an angle α between 90° and 180°. Flexible rod 104 may be a fiberglass rod.

The lower end 108 of trunk or signpost 102 may be angular. This may provide spacing of portions of trunk or signpost 102 between it and the ground 101. The spacing provided with the angular cut may enable the trunk or signpost to lean or sway upon being rubbed, mimicking an actual tree. The upper end 109 of trunk or signpost 102 may be angular. This may mitigate pooling of rain water on its upper surface which in turn may mitigate rotting of trunk or signpost 102.

At least one extending material 106 may be held with flexible rod 104 or licking branch 120. For example, grape vine may be held to flexible rod 104 or licking branch 120 and extend downwardly therefrom. Another luring material such as material 122 may be held to flexible rod 104. For example, a pine or cedar branch with needles may be held on flexible rod 104.

Trunk or signpost 102 may have a height, or length from its lower end to flexible rod 104 extending therefrom, "a" between about 3 feet and about 5 feet. Licking branch 106 may extend upwardly to a height "b" of about 6 feet from the lower end 108 of trunk or signpost 102.

Figure 2A:
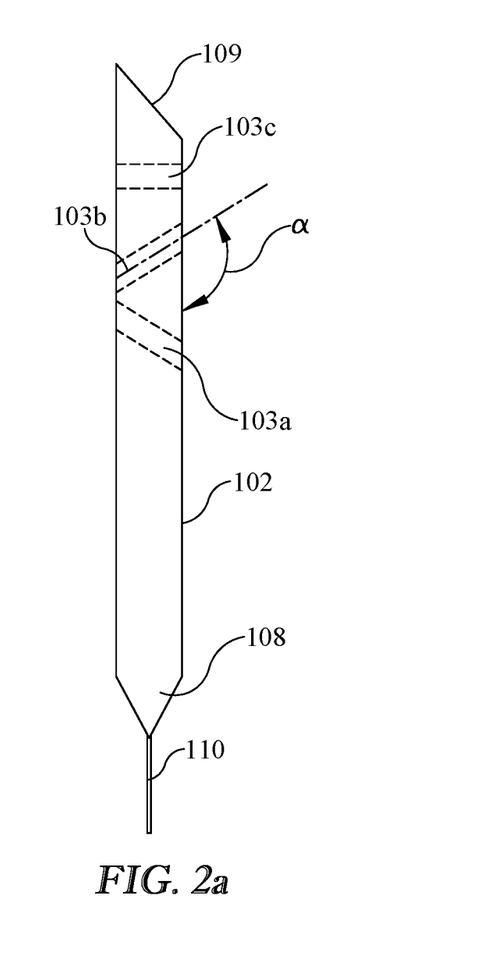
FIGS. 2a and 2b show features and embodiments of a trunk or signpost that may be a part of the deer rub or lure shown in FIG. 1.
Figure 2B:
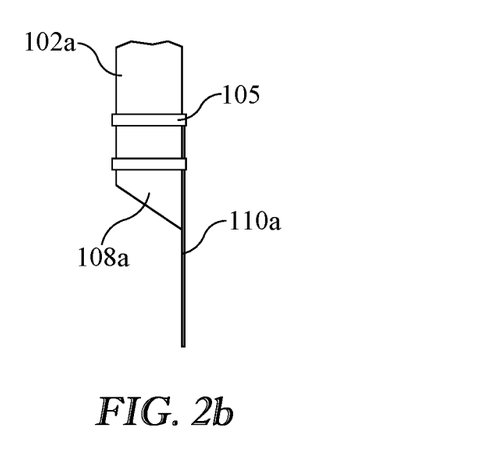

FIGS. 2a and 2b show features and embodiments of a signpost or trunk, 102 and 102a, that may be a part of deer rub or lure 100. Trunk 102 has a plurality of apertures 103a, 103b, and 103c, each configured and disposed to receive a flexible rod 104. The apertures may be drilled into trunk 102 at an angle α between 90° and 180°. The apertures for the insertion of flexible rods 104 may be at different heights and/or angles, for example the different heights and angles of apertures 103a, 103b, and 103c.

The lower end 108 and 108a of trunk 102 or 102a may be angular and have a support rod 110, 110a axially extending therefrom. Support rod 110 and 110a may be flexible, such as a springing rod or fiberglass rod. The angular cut of lower end of the trunk 108 and 108a and the placement of support rod 110 or 110a at the apex of the angle may provide a space or clearance between most of trunk 102 or 102a and the ground. This space or clearance may allow trunk 102 or 102a to move or be bent or swayed upon rubbing or pushing by a buck. For example, a buck may exercise his neck by pushing his antlers or head against the trunk or sign post to appear stronger to other bucks.

Inserting support rod 110 and 110a, into the ground may flexibly support trunk or signpost 102 and 102a in a substantially vertical orientation. Support rod 110 may be inserted centrally into a conical lower end 108 and support rod 110a or may be strapped to the side of trunk 102a, at the apex of angular cut lower end 108a, with straps 105. The support rod may be inserted into the ground by pounding on the trunk with a rubber mallet or object such as a rock or log. The upper end 109 of the trunk 102 may be angular to mitigate absorption of rain water and rotting.

Figure 3:
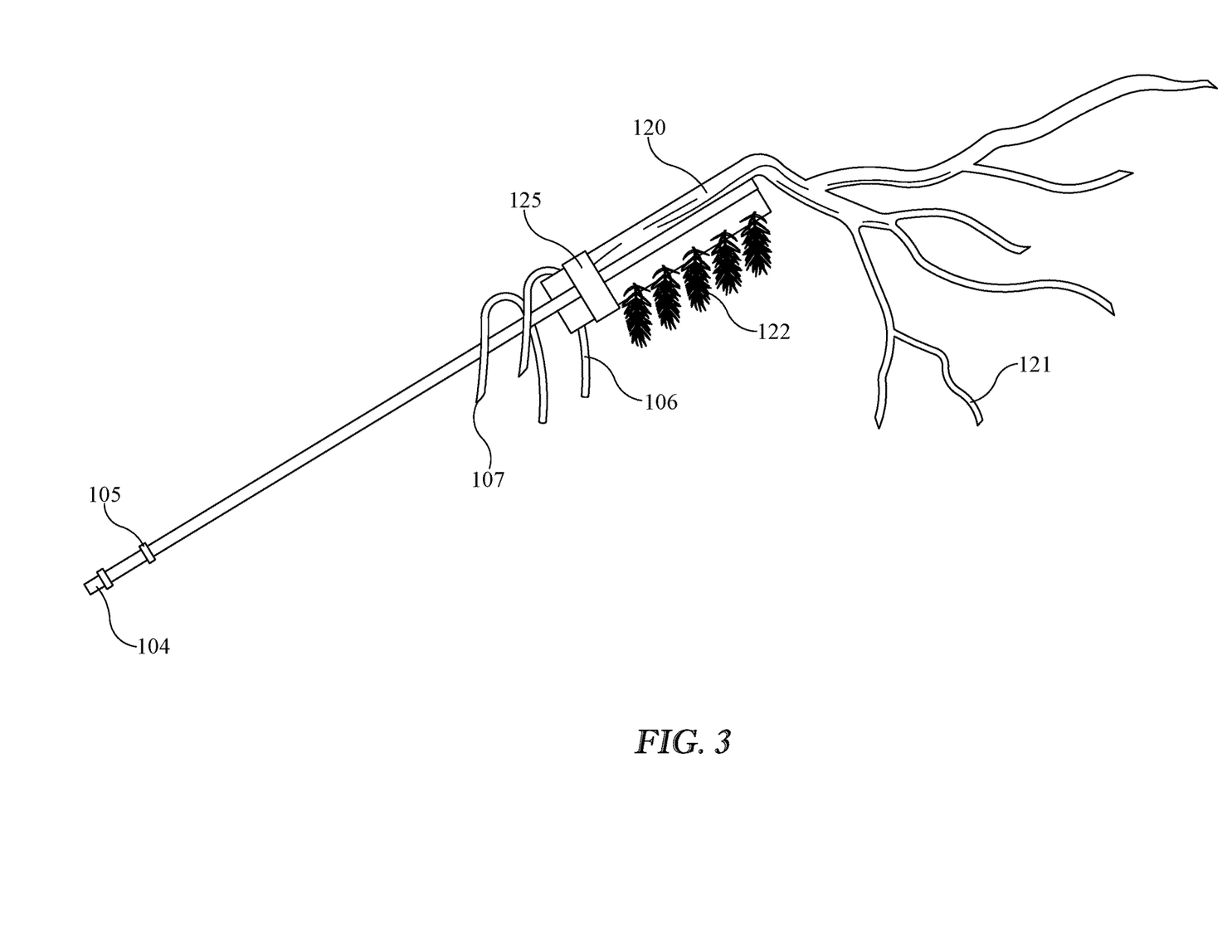
FIG. 3 shows an illustrative embodiment of a licking branch extending from a flexible rod and features that may be a part of the deer rub or lure shown in FIG. 1.

FIG. 3 shows an illustrative example of a flexible rod 104. Flexible rod 104 may be inserted into an aperture 103a, 103b, or 103c and may be held to trunk with one or more stops, clamps, or straps, 105. In at least one embodiment, an aperture may tightly receive a flexible rod 104 and a stop, clamp, or strap may not be needed to hold the licking branch in the aperture.

Licking branch 120 may be held to flexible rod 104. Portions or branches of licking branch 120 may extend beyond an upper end of flexible rod 104. Ends of licking branch 104 may be angular 121. Angular end 121 may provide the deer with a surface for scratching such as scratching of the head or face. In at least one embodiment, 103a, 103b, or 103c are configured to tightly hold a flexible rod 104 and may not need to extend entirely through trunk 102. For example, flexible rod 104 may be pressed into an aperture and held therein without a stop or clamp.

At least one extending material 106 may extend from flexible rod 104, another luring material 122, such as a cedar branch, or licking branch 120. For example, grape vine may be secured to flexible rod 104, licking branch 120, or other luring material 122. Extending material 106 may be tied, strapped, or clamped onto flexible rod 104. The extending material 106 may have one or two angular cut ends 107. In at least one embodiment, grape vines with angular cut ends 107 extend from flexible rod 104 or licking branch 120. Angular ends 107 and 121 may provide the deer with additional area for scratching such as scratching of the head or face and the transfer of scent. For example, a buck may deposit pre-orbital wax onto the licking branch. In at least one embodiment, licking branch 120 has an appearance of being previously chewed with the vine cut at angle 107. The angular cut ends of the licking branches and vine may provide an efficient transfer of scent to deer rub or lure 100. This transfer of scent, for example the transfer or pre-orbital wax, may provide an additional luring ability of deer rub or lure 100.

Another luring material 122 may be attached to flexible rod 104. For example, cedar, pine, or other conifer having needles, may be attached to flexible rod 104. In at least one embodiment, a cedar branch having needles is attached proximate an upper end of flexible rod 104. One or more straps or clamps 125 may be configured and disposed to hold licking branch 120, extending material 106, and material 122 onto flexible rod 104.

In at least one embodiment, flexible rod 104 holds a licking branch 120, a cedar branch 122, and grape vine 106, wherein the cedar branch may be held between the licking branch and the grape vine.

Figure 4A:
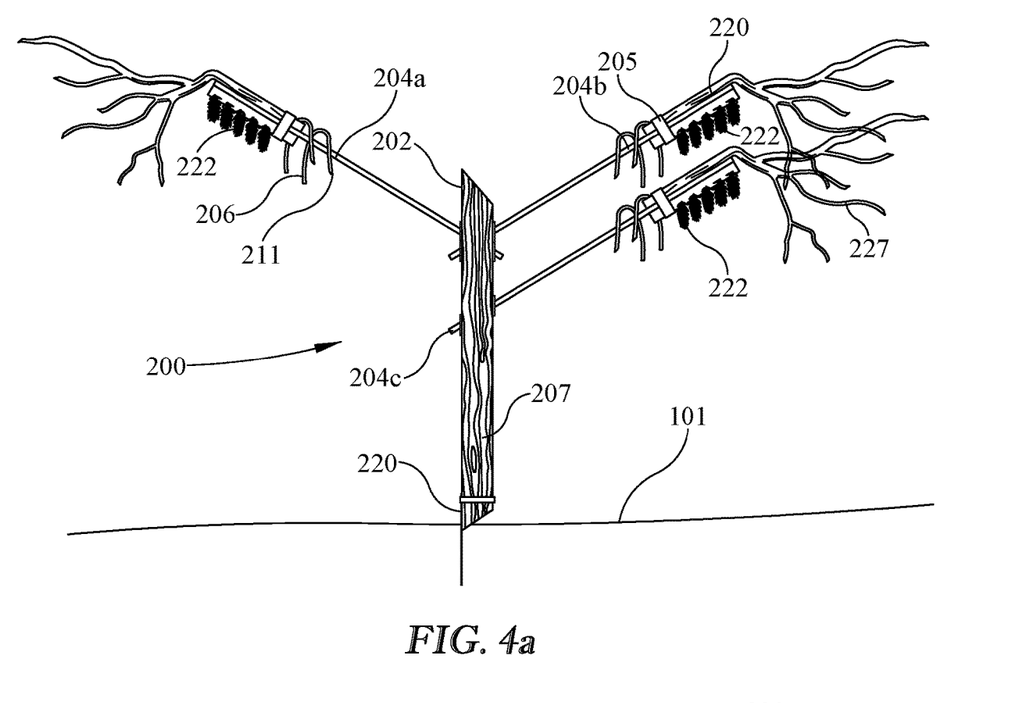
FIGS. 4a and 4b show an embodiment of the presently disclosed deer rub or lure of the present disclosure showing its transformation upon being worked by deer.
Figure 4B:
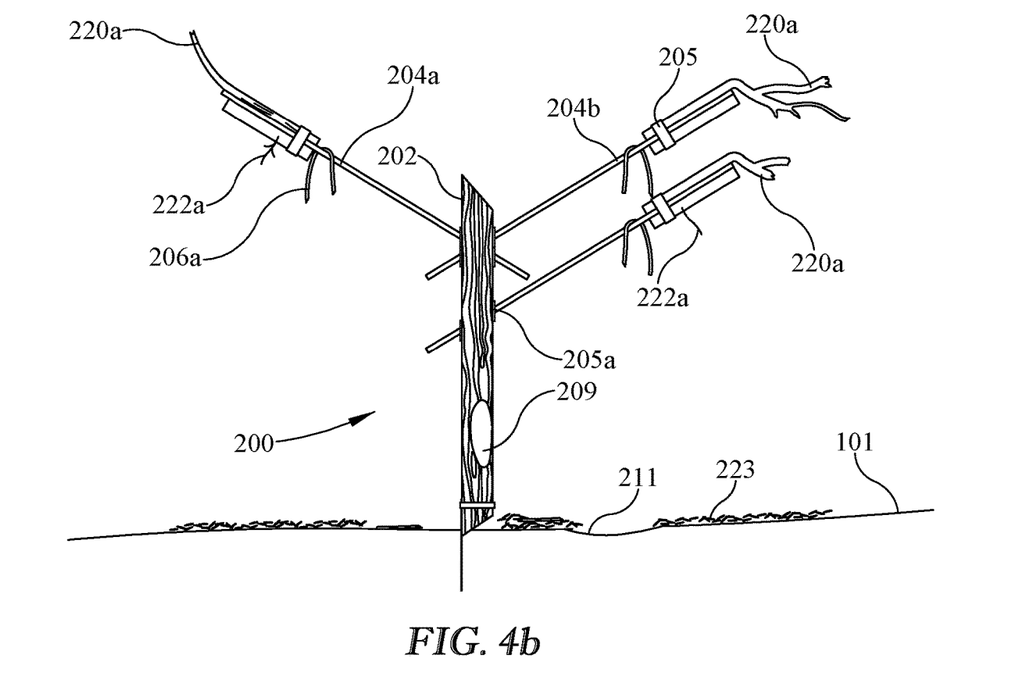

FIGS. 4a and 4b show deer rub or lure 200 before and after, respectively, luring and being worked by deer. Trunk or signpost 202 has an angular cut top and bottom. The angular cut top mitigates rotting and the angular cut bottom provides spacing for flexing or bending of support rod 210. For example, when a buck rubs on the area with bark 207, trunk 202 tilts about flexible support rod 210. The rubbed area may lose its bark and a rub 209 may be may made on trunk 202, transforming it into a signpost. Support rod 210 may be fiberglass or may be made of a metal spring material.

Trunk or signpost 202 may be made of a branch, or other portion, of a deciduous or coniferous tree. For example, trunk or signpost 202 may be made of hardwood such as locust, alder, balsa, beech, hickory, mahogany, maple, oak, teak, and walnut. Trunk or signpost 202 may be made of coniferous wood such as cedar or pine. Trunk 202 may be placed at a desired location with bark on an outer surface 207. Upon being rubbed by a deer, a portion of the bark may be removed, rub 209, and scent may be transferred to trunk or signpost 202. The rub 209 and scent may transform the trunk to a signpost. The signpost may show deer in the area that another deer is present. The signpost may further attract bucks which may also place their rub on trunk or signpost 202.

Trunk or signpost 202 has a plurality of flexible rods 204a, 204b, and 204c, extending upwardly therefrom. Flexible rods 204a, 204b, and 204c may extend into trunk or signpost 202 and may be held therein with one or more holders 205a, such as a clamp. Flexible rods 204a, 204b, and 204c are held with trunk or signpost 202 at varying angles and heights. For example, licking branches may extend into, or through, apertures in trunk 202 and may be held with holders 205a. Each flexible rod has a licking branch 220 attached proximate its end. Licking branches 220 may be held to a flexible rod with a holder, such as a strap or clamp. Licking branches 220 may be branches from hardwood or deciduous trees. Each licking branch may be of the same or different wood. For example, one or more licking branches 220 may be locust and others may be hickory or elm or other hardwood. Licking branches 220 may be taken from deciduous or hardwood trees such as locust, birch, poplar, alder, balsa, beech, hickory, mahogany, maple, oak, teak, walnut, or other tree that may be desirous for the deer. The lower licking branches, such as licking branch 220 held with flexible rod 204c, may provide a lure.

A portion of licking branch 220 extends beyond an end of the flexible rod to which it is attached. Licking branches 220 may have angular cut ends 227. Upon being worked by a deer, for example licking, chewing, scratching of head or face, and rubbing of antlers, licking branches 220 may have portions removed or otherwise show signs of being worked, for example licking branches 220a. Also, the deer working the licking branches may transfer their scent onto the licking branches, for example the transfer of pre-orbital wax from a buck. The visible marks and scent on the worked licking branches, 220a, may cause deer rub or lure 200 to become transformed into a signpost, luring other deer.

Extending material 206, for example grape vine, may extend from one or more licking branches 220, flexible rods 204a, 204b, and 204c, or other material 222. Extending material 206 may have one, or both, of its ends cut at an angle, 211. Upon being worked by a deer, for example licking, chewing, scratching of head or face, and rubbing of antlers, extending material 206 may have portions removed or otherwise show signs of being worked, for example extending material 206a.

Other material or wood 222 may be attached and held with one or more flexible rods 204a, 204b, and 204c. For example evergreen wood, such as a cedar branch, may be attached to one or more of the flexible rods. It may be desirous to have a tree's foliage, or needles of a sappy wood or coniferous evergreen, such as cedar, pine, fir, cypress, larch or spruce, attached to one or more flexible rods 204a, 204b, and 204c.

Upon being worked, such as rubbing of antlers, material 222 may lose needles and bark, 222a, which may make a bed of needles 223. A scrape 211 may be made by a buck proximate deer rub or lure 200 or in the bed of needles 223.

In at least one embodiment, at least one flexible rod holds a locust branch, which extends beyond an end of the flexible rod. Grape vine is attached to the flexible rod. Cedar is also attached to the flexible rod. For example, a flexible rod may hold a licking branch 220, a cedar branch 222, and grape vine 206, wherein the cedar branch may be held between the licking branch and the grape vine.

The signpost or trunk of this embodiment may be hardwood, cedar, or other deciduous or confer wood.

Bucks may taste and then rub their pre-orbital gland on the licking branches, cedar branch, and/or vines. The pre-orbital gland is located near the eye and pre-orbital wax or scent may be transferred onto the licking branch, vine, or other portions of the deer rub or lure. Bucks may also scrape proximate or under the deer rub or lure. The working of the deer rub or lure may attract another buck or doe. A doe may sense that a buck has been present and may urinate estrous, signifying to the buck that she is ready for breeding.

In at least one embodiment up to 4 flexible rods extend from the trunk or signpost. Each flexible rod may have a licking branch, a cedar limb, and a grape vine attached thereto.

Having thus described the deer rub or lure of the present disclosure, a method of luring a deer to a selected area is disclosed. A deer may be lured by selecting an area to which to lure the deer and flexibly supporting a trunk or signpost on the ground at the selected area. One or more flexible rods may be extended into an aperture in the trunk or signpost at an angle between 90° and 180°. A licking branch may be attached to the flexible rod with a portion extending beyond an upwardly extending end of the flexible rod.

The area for the placement of the deer lure may be carried out by selecting an area that has signs of deer activity. Flexibly supporting the trunk or signpost on the ground may be achieved by driving a flexible rod into the ground, wherein the flexible rod extends from a lower end of the trunk or signpost. The trunk or signpost may have bark on an outer surface thereof, upon flexibly supporting the trunk or signpost on the ground.

At least one flexible rod may be extended into an aperture in the trunk or signpost and a stop may be placed on the licking branch. The flexible rod may extend into the aperture and the stop may abut with the trunk or signpost. A second stop, clamp, or strap may be secured on the flexible rod on a downwardly extending end to prevent the licking branch from being pulled out of the aperture. Two or more flexible rods may be extended into different apertures in the trunk or signpost.

The licking branches may be comprised of different types of wood, such as locust, oak, cedar, or other wood. At least one extending material may be attached to at least one of the flexible rods, licking branches, or other material such as a cedar branch. For example, grape vine may extend from at least one of the flexible rods. At least one of the licking branches may be configured and disposed to extend a distance of at least 6 or 7 feet from the ground.

In at least one embodiment, a licking branch, grape vine, and a cedar branch are attached to a flexible rod. In at least one other embodiment, the cedar branch is held to the flexible rod between the licking branch and grapevine The invention is illustrated by example in the drawing figures, and throughout the written description. It should be understood that numerous variations are possible while adhering to the inventive concept. Such variations are contemplated as being a part of the present disclosure.

One feature or aspect of an embodiment is believed at the time of the filing of this patent application to possibly reside broadly in a deer rub or lure a trunk or signpost with at least one aperture extending therein; a flexible rod extending into at least one of the apertures; a licking branch attached to, and extending from, the flexible rod; wherein each of the flexible rods extend from the trunk or signpost at an angle between 90° and 180°; a flexible support extending from a lower end of the trunk or signpost, and wherein the flexible support is configured to flexibly support the trunk or signpost in a substantially vertical orientation.

Another feature or aspect of an embodiment is believed at the time of the filing of this patent application to possibly reside broadly in a deer rub or lure, the upper end and the lower end of the trunk or signpost is angular.

Yet another feature or aspect of an embodiment is believed at the time of the filing of this patent application to possibly reside broadly in a deer rub or lure, wherein the support comprises a flexible or springing rod extending axially from the lower end of the trunk or signpost.

Still another feature or aspect of an embodiment is believed at the time of the filing of this patent application to possibly reside broadly in a deer rub or lure, wherein outwardly extending ends of the licking branch are angular.

A further feature or aspect of an embodiment is believed at the time of the filing of this patent application to possibly reside broadly in a deer rub or lure further comprising at least one extending material, extending from the at least one flexible rod.

Another feature or aspect of an embodiment is believed at the time of the filing of this patent application to possibly reside broadly in a deer rub or lure, wherein the extending material comprises grape vine.

A further feature or aspect of an embodiment is believed at the time of the filing of this patent application to possibly reside broadly in a deer rub or lure further comprising a cedar branch attached to the flexible rod.

Yet another feature or aspect of an embodiment is believed at the time of the filing of this patent application to possibly reside broadly in a deer rub or lure, wherein the extending material has an angular cut end.

Still another feature or aspect of an embodiment is believed at the time of the filing of this patent application to possibly reside broadly in a deer rub or lure, wherein the trunk or signpost is between about 3 feet and about 5 feet in length.

A further feature or aspect of an embodiment is believed at the time of the filing of this patent application to possibly reside broadly in a deer rub or lure, wherein the at least one licking branch extends to about 6 feet from the lower end of the trunk signpost.

Another feature or aspect of an embodiment is believed at the time of the filing of this patent application to possibly reside broadly in a deer rub or lure, wherein the trunk or signpost has bark for rubbing off by the deer.

Yet another feature or aspect of an embodiment is believed at the time of the filing of this patent application to possibly reside broadly in a method of luring a deer to a selected area comprising the steps of: selecting an area to which to lure the deer; flexibly supporting a trunk or signpost on the ground at the selected area; extending at least flexible rod into an aperture in the trunk or signpost, from the trunk or signpost at an angle between 90° and 180°; and attaching a licking branch to the flexible rod and extended a portion of the licking branch beyond an upwardly extending end of the flexible rod.

One feature or aspect of an embodiment is believed at the time of the filing of this patent application to possibly reside broadly in a method of luring a deer to a selected area comprises selecting an area that has signs of deer activity.

Another feature or aspect of an embodiment is believed at the time of the filing of this patent application to possibly reside broadly in a method of luring a deer to a selected area comprises driving a flexible rod into the ground, wherein the flexible rod extends from a lower end of the trunk or signpost.

Yet another feature or aspect of an embodiment is believed at the time of the filing of this patent application to possibly reside broadly in a method of luring a deer to a selected area wherein the trunk or signpost has bark on an outer surface thereof, upon the flexibly supporting the trunk or signpost on the ground.

Still another feature or aspect of an embodiment is believed at the time of the filing of this patent application to possibly reside broadly in a method of luring a deer to a selected area wherein the extending the at least one flexible rod into the at least aperture in the trunk or signpost comprises placing a stop, such as a clamp, on the at least one flexible rod and extending the at least one flexible rod into the at least one aperture and abutting the stop with the trunk or signpost.

A further feature or aspect of an embodiment is believed at the time of the filing of this patent application to possibly reside broadly in a method of luring a deer to a selected area comprises extending at least two flexible rods into different apertures in the trunk or signpost.

Another feature or aspect of an embodiment is believed at the time of the filing of this patent application to possibly reside broadly in a method of luring a deer to a selected area comprises attaching licking branches comprised of different types of wood onto the different flexible rods.

Yet another feature or aspect of an embodiment is believed at the time of the filing of this patent application to possibly reside broadly in a method of luring a deer to a selected area comprises attaching at least one extending material to at least one of the flexible rods.

Still another feature or aspect of an embodiment is believed at the time of the filing of this patent application to possibly reside broadly in a method of luring a deer to a selected area comprises attaching grape vine to at least one of the flexible rods.

A further feature or aspect of an embodiment is believed at the time of the filing of this patent application to possibly reside broadly in a method of luring a deer to a selected area comprises extending an end of at least one licking branch to a distance of at least 6 feet from the ground.

The invention claimed is:

1. A deer rub or lure consisting of: a tree trunk, tree limb, or portion thereof, with at least one aperture extending therein; a flexible rod extending into at least one of the apertures; a licking branch attached to, and extending from, the flexible rod; wherein the tree trunk, tree limb, or portion thereof has hardwood, cedar, or other deciduous or confer wood and a lower end and an upper end; wherein each of the flexible rods extend from tree trunk, tree limb, or portion thereof, at an angle between 90° and 180°; the lower end is angular and has an apex configured and disposed to become proximate and above a ground surface; a flexible support or springing rod extending axially from proximate the apex of the lower end of the tree trunk, tree limb, or portion thereof, and wherein the flexible support or springing rod is configured to flexibly support the tree trunk, tree limb, or portion thereof in a substantially vertical orientation.

2. The deer rub or lure of claim 1, wherein the upper end of the tree trunk, tree limb, or portion thereof is angular.

3. The deer rub or lure of claim 1, wherein outwardly extending ends of the licking branch are angular.

4. The deer rub or lure of claim 1, wherein the tree trunk, tree limb, or portion thereof is between about 3 feet and about 5 feet in length.

5. The deer rub or lure of claim 1, wherein the at least one licking branch extends to about 6 feet from the lower end of the tree trunk, tree limb, or portion thereof.

6. A method of luring a deer to a selected area consisting of the steps of: selecting an area to which to lure the deer; attaching or inserting a flexible support or springing rod proximate an apex on an angular lower end of a tree trunk tree limb, or portion thereof; inserting the flexible support or springing rod into a ground surface and moving the apex proximate or adjacent the ground surface, and thereby flexibly supporting the tree trunk tree limb, or portion thereof proximate and above the ground surface, at the selected area; extending a flexible rod into an aperture in the tree trunk tree limb, or portion thereof, from the tree trunk, tree limb, or portion thereof at an angle between 90° and 180°; and attaching a licking branch to the flexible rod and extending a portion of the licking branch beyond an upwardly extending end of the flexible rod.

7. The method of claim 6, wherein the selected area has signs of deer activity.

8. The method of claim 6, wherein the tree trunk, tree limb, or portion thereof has bark on an outer surface thereof.

9. The method of claim 6, wherein the flexible rod is extended into the aperture in the tree trunk, tree limb, or portion thereof at a length sufficient to abut a stop on the flexible rod with the tree trunk, tree limb, or portion thereof.

10. The method of claim 6, wherein at least two of the flexible rods are inserted into different apertures in the tree trunk, tree limb, or portion thereof.

11. The method of claim 6, wherein the licking branch has an end extending a distance of at least 6 feet from the ground surface.

12. A deer rub or lure consisting of: a tree trunk, tree limb, or portion thereof, with at least one aperture extending therein; a flexible rod extending into at least one of the apertures; a licking branch attached to, and extending from, the flexible rod; at least one of an extending material and a cedar branch attached to, and extending from, the flexible rod; wherein the tree trunk, tree limb, or portion thereof has hardwood, cedar, or other deciduous or confer wood and a lower end and an upper end; wherein each of the flexible rods extend from tree trunk, tree limb, or portion thereof, at an angle between 90° and 180°; wherein the lower end of the tree trunk, tree limb, or portion thereof is angular and has an apex configured and disposed to become proximate and above a ground surface; a flexible support or springing rod extending axially from proximate the apex of the lower end of the tree trunk, tree limb, or portion thereof, and wherein the flexible support or springing rod is configured to flexibly support the tree trunk, tree limb, or portion thereof in a substantially vertical orientation.

13. The deer rub or lure of claim 12, wherein the extending material is grape vine.

14. The deer rub or lure of claim 12, wherein the extending material has an angular cut end.

15. The deer rub or lure of claim 12, wherein the cedar branch is attached to the flexible rod between the outwardly extending end of the licking branch and the extending material.

\* \* \* \* \*